United States Patent Office 3,674,332
Patented July 4, 1972

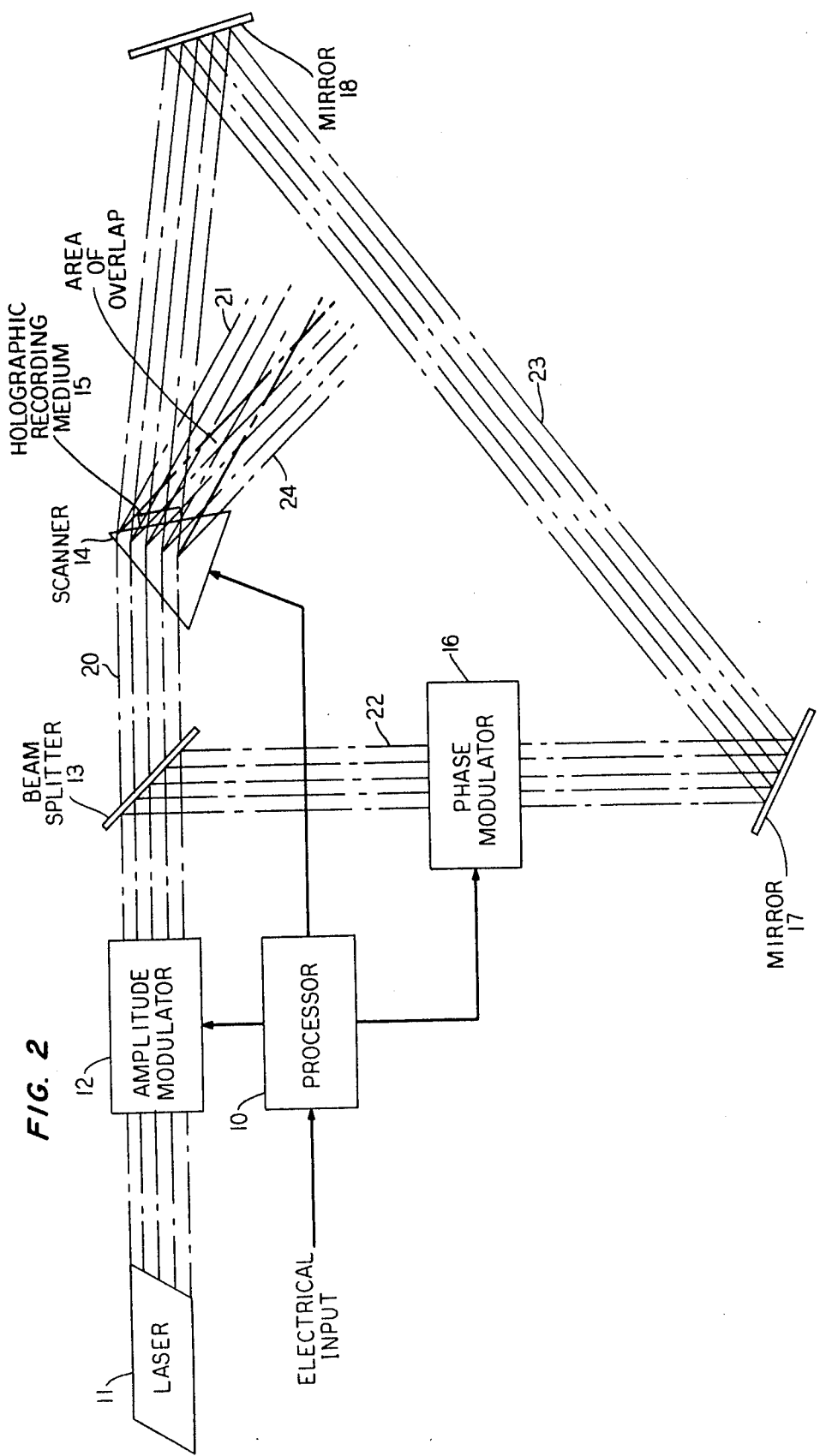

---

3,674,332
HOLOGRAM GENERATOR USING SUPERPOSITION OF PLANE WAVES
Herwig Werner Kogelnik, Fair Haven, N.J., assignor to Bell Telephone Laboratories, Incorporated, Murray Hill, N.J.
Filed Nov. 23, 1970, Ser. No. 91,909
Int. Cl. G01d 9/42; G02b 27/00
U.S. Cl. 350—3.5                              7 Claims

ABSTRACT OF THE DISCLOSURE

A system which generates holograms from electrical signals superimposes a series of light waves in a thick hologram recording medium. A processor determines the amplitude, phase, and angle of incidence of the series of light waves needed to generate the hologram from the electrical signal. These light waves are then generated with amplitude modulation, phase modulation, and deflection devices, and are made to interfere with reference light waves. This causes a series of interference patterns to be superimposed in the recording medium, thereby producing the hologram.

BACKGROUND OF THE INVENTION

This invention relates to holograms and, more particularly, to methods for generating holograms from electrical signals.

One of the most useful properties of holograms is the three-dimensional quality it gives to pictures. At the present time various systems are being developed which will be able to generate an electrical signal equivalent of a hologram. In one of these systems, the signal is created by splitting a coherent light source into reference and object beams. The reference beam is directed onto the face of a vidicon and the object beam is used to illuminate the object to be recorded. When the reflected light from the object reaches the vidicon, it interferes with the reference beam forming the hologram fringe pattern of the object on the face of the vidicon. As the vidicon scans its face, an electrical signal representative of the hologram is generated. Another method of generating the electrical signal employs a photomultiplier tube. With this method, the object to be recorded is illuminated by a light source and the reflected light from the object impinges on the photomultiplier. Then a narrow reference beam scans the face of the photomultiplier, creating a point of localized interference. By setting the bias of the tube properly, only the fringe pattern is converted into an electrical signal. The signals generated by these techniques or by computer programs can be transmitted to a remote location and reconstructed. In this way three-dimensional views or even three-dimensional television could be transmitted to any location.

The present methods of reconstructing the hologram from the electrical signal involve deflecting an electron beam in a raster pattern synchronized with the scanning raster and amplitude modulating it with the electrical signal. In some cases, a cathode ray tube is used and the fringe patterns are photographed on its face. In other cases, the electron beam is directed onto the film itself. One problem with this method is that only two-dimensional holograms can be generated with an electron beam. Therefore, thin holographic mediums, which are much less efficient than thick holographic mediums, must be used. Another drawback of the conventional techniques is the need for the development of the exposed film. If, as in the present invention, a thick holographic medium, such as barium titanate or lithium niobate, is used, there is no need for development and real time displays are obtained.

Another problem with the prior art is that the size of the light and electron beams determine the resolution of the hologram generated, provided the recording medium has sufficient resolution. However, if the information for a single frame were stored in a digital computer, enhancement techniques could be used to increase the resolution.

SUMMARY OF THE INVENTION

The present invention is directed to reducing the problem of low efficiency and resolution in the generation of holograms from electrical signals by using the superposition of light waves in a thick holographic medium. The efficiency is improved because the fringe patterns are stored as phase changes in the thick holographic medium rather than density changes in a thin photographic medium. The resolution requirements for the scanner are relaxed because they no longer depend on the spot size of the scanning beam. Also, this technique effectively involves scanning of the object and not the fringe pattern. Since there are about four times more resolvable points in the fringe pattern than the object itself, the resolution requirements are reduced still further.

In an illustrative embodiment of the invention, the holograms are generated by the superposition of plane waves in a thick holographic recording medium. However, spherical waves could be used also. The amplitude, phase, and angle of incidence of the plane waves required for the hologram are determined from the electrical signal in a processor. The system employs a laser whose output beam is passed through an amplitude modulator to a beam splitter. After the beam splitter, the transmitted wave is deflected by a scanner onto the recording medium. The reflected beam from the beam splitter is passed through a phase modulator to a mirror. The laser beam from the mirror is then reflected onto the recording medium. There it interferes with the beam from the scanner, producing fringe patterns. The amplitude and phase modulators and the scanner are under the control of the processor. As the processor causes the angle of the scanner to change, it causes the amplitude and phase modulators to change, producing a new fringe pattern. The process is repeated a multiplicity of times, each pattern being superimposed on the others.

The various features of the present invention will be more readily apparent from the following detailed description and drawing.

BRIEF DESCRIPTION OF THE DRAWING

FIG. 2 is an illustrative embodiment of the invention using a scanner without moving parts.

DETAILED DESCRIPTION

Figure 1:
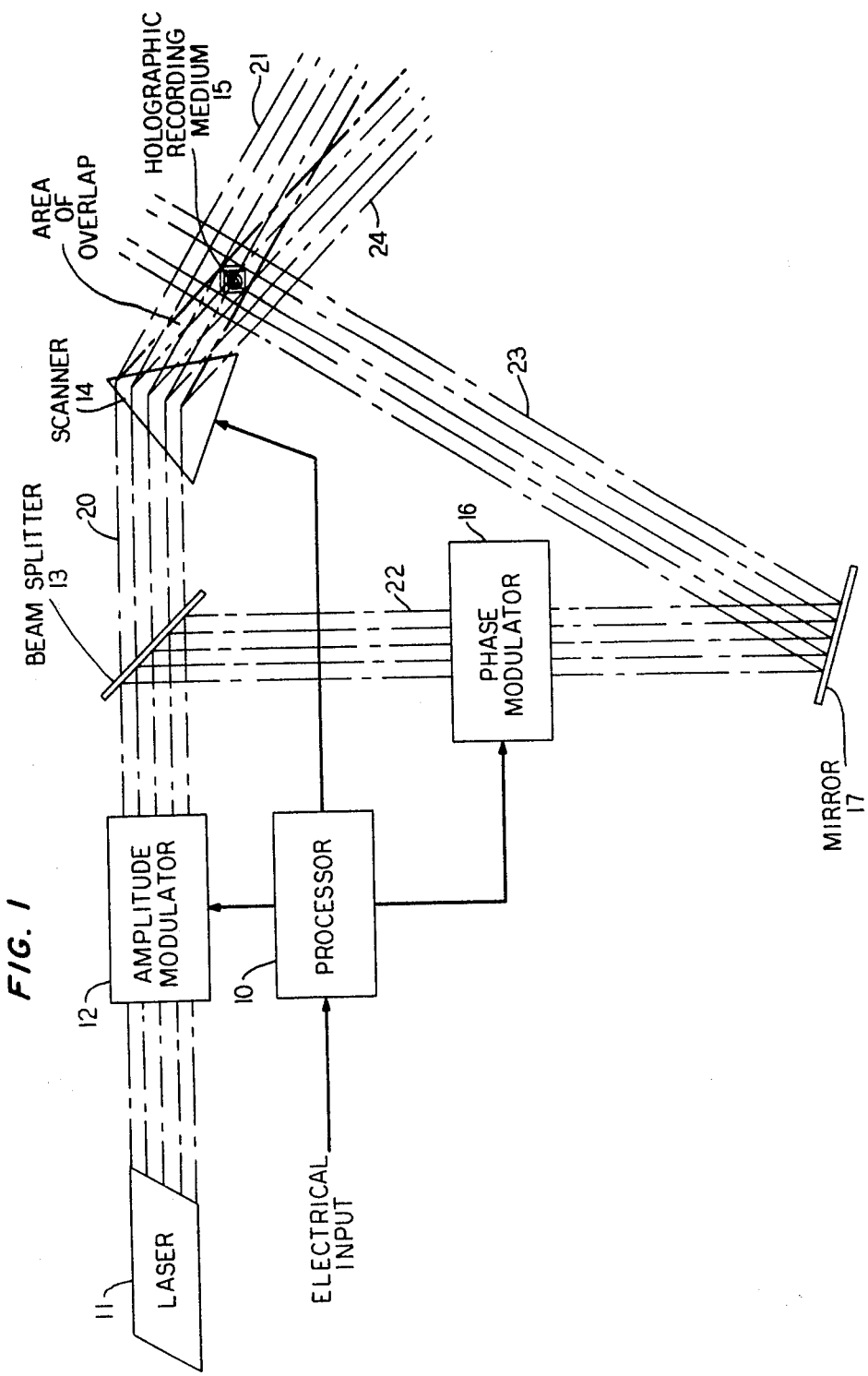
FIG. 1 is an illustrative embodiment of the invention.

The arrangement of FIG. 1 is a preferred embodiment of the present invention. The electrical signal which is stored in a computer, calculated by a computer or created by a hologram signal generator is applied to processor 10. The processor then generates amplitude, phase, and angle of incidence control signals. The form of the processor depends on the source of the electrical signal. For example, when the signal source is a digital computer the amplitude, phase and angle information are determined by the computer and are applied to the processor as a time-division multiplex signal. In that case the processor consists of a demodulator and three digital-to-analog converters, each having an output circuit matched to the modulator or scanner it is to drive.

As another example, when the signal source is a hologram signal generator, the processor is the equivalent of a special purpose computer. It has a memory size capable of storing a frame of information and is programmed in a standard manner to convert this information into the necessary control signals. However, it is also possible to generate the control signals on a real time basis without a computer. If the signal generator covers the object in a prescribed manner, relatively simple circuitry can be used to generate the control signals directly from the electrical signal on an analog basis.

The amplitude output of the processor is applied to amplitude modulator 12 which controls the light passing through it from laser 11. The laser is any of the types currently available and is selected to give the best results with the recording medium used. The amplitude modulator is also of any standard type. For example, the amplitude modulator could consist of an input polarizer, a KD*P crystal and an output analyzer. With this type modulator the input light would be linearly polarized. Then, by applying voltage to the crystal, the angle of polarization with respect to the analyzer could be changed, producing a light beam of variable intensity.

The output of the amplitude modulator 12 is applied to a beam splitter 13, which produces a scanning beam 20 and a reference beam 22. The scanning beam is applied to scanner 14, which, under the control of the processor, deflects the light beam at various angles. The scanner is any of the standard light deflectors, such as the acousto-optic, piezoelectric, or mechanical types currently used. For example, when a mechanical scanner is used, a raster type deflection is preferable. Also, the scanner could be equipped with a position encoder which is used to give the processor information about the position of the scanner. In such an arrangement, the processor generates amplitude and phase information based on the scanner's position.

The light output of the scanner, beam 21, is applied to the thick holographic recording medium 15. This medium could also be a thin or photographic recording medium; but, higher efficiencies are achieved with thick mediums. Also, the efficiency of a thin medium is reduced by 1/N where N is the number of exposures. In this case, N would be nearly equal to the number of resolvable spots in the object. The thick medium is any of the standard materials currently in use which record holograms as spatial variations of either the absorption constant or the refractive index, or both. Also, real-time displays can be made if an appropriate recording medium, like lithium niobate, is used. Beam 24 indicates the output of the scanner for a different angle than that of beam 21.

The reference beam 22 from the beam splitter 13 passes through phase modulator 16. The phase modulator may, for example, consist of a polarizer and a KD*P crystal, similar to those used with the amplitude modulator. The phase modulator is under the control of the processor and changes the phase relationship between the reference and scanning beam in response to it. The output of the phase modulator is reflected onto the recording medium as light beam 23 by the mirror 17. At the recording medium the scanning beam 21 and the reference beam 23 are essentially plane waves which interfere, causing the fringe pattern, which is recorded. As the scanner's position is changed the amplitude and phase of the waves are changed and a new fringe pattern is generated. This is repeated a multiplicity of times, depending on the accuracy desired, and each new pattern is superimposed on the old ones, creating the hologram. Naturally, the size of the hologram created depends on the size of light beams 21 and 23. Therefore, it may be desirable to place beam expanders in the system. One would intercept beam 23 and the other would intercept beam 20. Also, the phase modulator could be located so as to intercept the scanning beam 20 instead of the reference beam 22. Another possible change would be the relocation of the amplitude modulator so that it would not affect the reference beam. However, the present arrangement reduces the background light that reaches the recording medium.

FIG. 2 is an embodiment of the present invention using a scanner without moving parts such as an acousto-optic or piezoelectric scanner. This arrangement functions the same as the arrangement of FIG. 1 except that the recording medium is placed against the scanner and an additional mirror, 18, is provided. The mirror, 18, allows the light beam 23 to be reflected into the back of the recording medium causing light beams 23 and 21 to interfere in the medium as in FIG. 1. If an acousto-optic modulator were used, a lead molybdate type would work well.

The size of the hologram generated in both FIG. 1 and FIG. 2 is determined not only by the size of the light beam, but by the angles the scanner covers and the distance from the scanner to the recording medium. Since the hologram must be completely covered by the light beam from the scanner, the hologram can be no larger than the area of overlap between the scan beams at the greatest deflections. As shown in both figures, this area increases as you get closer to the scanner. Therefore, with scanners that have no moving parts the recording medium can be placed against the scanner, creating the largest hologram for a particular beam size.

If an acousto-optic scanner is used, there is a frequency shift equal to the acoustic frequency in the output light beam. This must be compensated for by a corresponding shift in the frequency of the reference beam. Also, if the wavelength of the light used to view the hologram is different than the wavelength of the light used to write the hologram, it would be necessary to cause the reference beam to scan during the writing period, thereby maintaining the Bragg condition in the medium for the viewing light. This would mean that mirror 17 of FIG. 1 and mirror 18 of FIG. 2 would have to be replaced with scanners.

Some constraints on the system can be described by a brief analysis of the system. Let the complex amplitude of the wavefront to be recorded in the hologram be $$A(x, y) = e^{-jkz} \Sigma\Sigma \alpha_{pq} e^{j[\phi_{pq} - (px+qy)]} \quad (1)$$

where $\alpha_{pq}$ is the amplitude of a plane wave, $p$ and $q$ are the direction cosines of the plane, and $\Phi_{pq}$ is its phase. As the scanner changes position in the X-Y plane, the direction cosines change. This provides a function $e^{-j(kz+px+qy)}$ for each deflection state, $pq$, which corresponds to a term in the plane wave representation in Equation 1. If for a particular deflection state the amplitude of the scan leg is $\alpha$ and the amplitude of the reference leg is $\rho$, the hologram element read-in will be $$h_{pq} = \sigma\sigma^x + \rho\rho^x + \alpha\rho^x e^{-j(px+qy+2p_0 x)} + \alpha^x \rho e^{j(px+qy+2p_0 x)} \quad (2)$$

for small angles. To achieve the correct values, the amplitude and phase modulators must be able to insure that $$|\alpha\rho^x| = \alpha_{pq} \quad (3)$$

and $$\text{angle of } (\alpha\rho^x) = \phi_{pq} \quad (4)$$

Since the amplitude modulator affects both legs, the background $\alpha\alpha^x + \rho\rho^x$ is reduced, thereby improving efficiency. Also, the light output at the amplitude modulator must be $\sqrt{\alpha_{pq}}$ and the phase modulator must vary with $-\Phi_{pq}$ if it is in the reference leg and $+\Phi_{pq}$ in the scan leg.

It is important to note that the resolution requirements on the X-Y scanner are essentially equal to the number of resolvable spots of the object, which is considerably less than the resolvable spots of the corresponding hologram fringe pattern. Therefore, the present system's resolution requirements are less than those of the prior art.

While the invention has been particularly shown and described with reference to the preferred embodiment thereof, it will be understood by those skilled in the art that various changes in form and details may be made therein without departing from the spirit of the invention. In particular, spherical waves rather than plane waves could be used without departing from the teachings of the invention.

I claim:

1. A system for generating holograms from electrical signals by the superposition of a series of plane waves, said electrical signals containing amplitude, phase and angle of incidence information about said plane waves and representing a hologram of an object, said system comprising:
   a processing means for processing the electrical signal and generating therefrom amplitude, phase, and angle of incidence control signals,
   a stationary source of substantially coherent monochromatic plane waves in the form of a light beam of width, W,
   an amplitude modulator which uniformly varies the amplitude across the width W of the beam of plane waves from said stationary source in accordance with the control signals from said processing means,
   a beam splitter which intercepts the beam of plane waves as they exit said amplitude modulator, transmitting part of the energy as scan beam plane waves and reflecting part as reference beam plane waves,
   a phase modulator which varies the phase of the reference beam plane waves from said beam splitter in accordance with the control signals from said processing means,
   a scanning means for deflecting the scan beam plane waves transmitted through said beam splitter in accordance with the control signals from said processing means,
   a mirror which reflects the reference beam plane waves from said phase modulator,
   and a recording medium in which the reference beam plane waves from said mirror and the scan beam plane waves from said scanner interfere a multiplicity of times, each interference pattern superimposed on the other, said beam width W being large enough that the region of interference of the reference and scan beams covers the entire area of the hologram being recorded.

2. A system as claimed in claim 1 wherein said coherent source is a laser.

3. A system as claimed in claim 1 wherein said recording medium is a thick holographic recording medium capable of storing information as spatial variations of refractive index.

4. A system as claimed in claim 1 wherein said processor is a preprogrammed digital computer with its output coupled to three digital-to-analog converters whose outputs are the amplitude, phase, and angle control signals.

5. A system as claimed in claim 1 wherein the amplitude and phase modulators contain KD*P crystals.

6. A system as claimed in claim 1 wherein the scanner is of the acousto-optic type.

7. A system for generating holograms from electrical signals by the superposition of a series of plane waves, said electrical signals containing amplitude, phase and angle of incidence information about said plane waves and representing a hologram of an object, said system comprising:
   a processing means for processing the electrical signal and generating therefrom amplitude, phase, and angle of incidence control signals,
   a stationary source of substantially coherent monochromatic plane waves in the form of a light beam of width, W,
   an amplitude modulator which uniformly varies the amplitude across the width W of the beam of plane waves from said stationary source in accordance with the control signals from said processing means,
   a beam splitter which intercepts the beam of plane waves as they exit said amplitude modulator, transmitting part of the energy as scan beam plane waves and reflecting part as reference beam plane waves,
   a phase modulator which varies the phase of the reference beam plane waves from said beam splitter in accordance with the control signals from said processing means,
   a scanning means having no moving parts which deflects the scan beam plane waves transmitted through said beam splitter in accordance with the control signals from said processing means,
   a first mirror which reflects the reference beam plane waves from said phase modulator,
   a second mirror which reflects the reference beam plane waves from said first mirror,
   and a recording means placed in close proximity to said scanning means, in which the reference beam plane waves from said second mirror enter from the rear and the scan beam plane waves from said scanning means enter from the front, thereby causing the reference and scan beam plane waves to interfere with each other a multiplicity of times, each interference pattern superimposed on the other said beam width W being large enough that the region of interference of the reference and scan beams covers the entire area of the hologram being recorded.

References Cited

UNITED STATES PATENTS 3,516,721   6/1970   Collier et al. _____ 350—3.5
3,529,887   9/1970   Lu _____ 350—3.5

OTHER REFERENCES

Stroke et al., Proc. of the IEEE, vol. 55, No. 1, January 1967, pp. 109–111.

Gabor et al., Physics Letters, vol. 18, No. 2, August 1965, pp. 116–118.

La Macchia et al., Applied Optics, vol. 7, No. 9, September 1968, pp. 1857–58.

DAVID SCHONBERG, Primary Examiner

R. J. STERN, Assistant Examiner

U.S. Cl. X.R.

346—108; 350—162 R